(12) United States Patent
Thompson (10) Patent No.: US 6,740,135 B2
(45) Date of Patent: May 25, 2004

(54) FIRE LOG SYSTEM

(76) Inventor: Eugene R. Thompson, 2703 - 50th Ave., Lone Rock, IA (US) 50559

( * ) Notice: Subject to any disclaimer, the term of this patent is extended or adjusted under 35 U.S.C. 154(b) by 3 days.

(21) Appl. No.: 10/288,124

(22) Filed: Nov. 4, 2002

(65) Prior Publication Data

US 2003/0070349 A1 Apr. 17, 2003

Related U.S. Application Data

(63) Continuation-in-part of application No. 09/780,290, filed on Feb. 9, 2001, now Pat. No. 6,514,300.
(51) Int. Cl.[7] .................................................. C10L 5/36
(52) U.S. Cl. .............................. 44/530; 44/532; 44/533; 44/542; 44/544; 44/589; 44/605
(58) Field of Search .......................... 44/530, 532, 533, 44/542, 544, 589, 605

(56) References Cited

U.S. PATENT DOCUMENTS 3,635,684 A * 1/1972 Seymour ...................... 44/576
6,514,300 B2 * 2/2003 Thompson ................... 44/535

FOREIGN PATENT DOCUMENTS

FR          2642434       *  8/1990

* cited by examiner

Primary Examiner—Cephia D. Toomer (57) ABSTRACT

A fire log system for providing an efficient corn based fuel that is burnable within conventional fireplaces. The fire log system includes a housing having a front opening, a volume of particulate corn within the interior of the housing, a plurality of corn cobs within the front opening of the housing for retaining the particulate corn, and a plurality of retaining members secured about the front opening. The housing with the corn cobs and particulate corn is preferably dipped within a wax material after formed. A wick member preferably is positioned within the front opening for assisting in the lighting of the fire log system.

20 Claims, 7 Drawing Sheets

FIRE LOG SYSTEM

CROSS REFERENCE TO RELATED APPLICATIONS

I hereby claim benefit under Title 35, United States Code, Section 120 of U.S. patent application Ser. No. 09/780,290 filed Feb. 9, 2001. This application is a continuation-in-part of the U.S. Ser. No. 09/780,290 application filed Feb. 9, 2001, now U.S. Pat. No. 6,514,300. The U.S. Ser. No. 09/780,290 application is now U.S. Pat. No. 6,514,300. The U.S. Ser. No. 09/780,290 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to fire logs and more specifically it relates to a fire log system for providing an efficient corn based fuel that is burnable within conventional fireplaces.

2. Description of the Related Art

Logs have been in use for years. A conventional log is simply comprised of a piece of wood from various types of trees. Modern logs are comprised of particulate wood material bonded together into a cylindrical structure that are commonly wrapped in a flammable wrapping to initiate the fire.

Conventional log devices are difficult to ignite by conventional means and often times require the user to apply a flammable chemical which can be dangerous to ignite and cause significant pollution. Another problem with convention log devices is that they can be extremely messy to utilize with portions of the log such as the bark falling from the log onto the floor of a user's home. Another problem with conventional log devices is that they need to be replaced after a relatively short period of time with a fresh log.

While these devices may be suitable for the particular purpose to which they address, they are not as suitable for providing an efficient corn based fuel that is burnable within conventional fireplaces. Conventional fire log products do not utilize corn based fuels.

In these respects, the fire log system according to the present invention substantially departs from the conventional concepts and designs of the prior art, and in so doing provides an apparatus primarily developed for the purpose of providing an efficient corn based fuel that is burnable within conventional fireplaces.

BRIEF SUMMARY OF THE INVENTION

In view of the foregoing disadvantages inherent in the known types of artificial logs now present in the prior art, the present invention provides a new fire log system construction wherein the same can be utilized for providing an efficient corn based fuel that is burnable within conventional fireplaces.

The general purpose of the present invention, which will be described subsequently in greater detail, is to provide a new fire log system that has many of the advantages of the artificial logs mentioned heretofore and many novel features that result in a new fire log system which is not anticipated, rendered obvious, suggested, or even implied by any of the prior art artificial logs, either alone or in any combination thereof.

To attain this, the present invention generally comprises a housing having a front opening, a volume of particulate corn within the interior of the housing, a plurality of corn cobs within the front opening of the housing for retaining the particulate corn, and a plurality of retaining members secured about the front opening. The housing with the corn cobs and particulate corn is preferably dipped within a wax material after formed. A wick member preferably is positioned within the front opening for assisting in the lighting of the fire log system.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a fire log system that will overcome the shortcomings of the prior art devices.

A second object is to provide a fire log system for providing an efficient corn based fuel that is burnable within conventional fireplaces.

A further object is to provide a log system for providing a log system that is easy to light which burns longer and cleaner than conventional logs.

Another object is to provide a log system that does not utilize non-flammable materials in the construction.

An additional object is to provide a log system that may be utilized as a portable seat.

A further object is to provide a log system that provides a pleasant appearing flame.

Another object is to provide a log system that may be easily transported.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Turning now descriptively to the drawings, in which similar reference characters denote similar elements throughout the several views, FIGS. 1 through 7 illustrate a fire log system 10, which comprises a housing 20 having a front opening 22, a volume of particulate corn 60 within the interior of the housing 20, a plurality of corn cobs 50 within the front opening 22 of the housing 20 for retaining the particulate corn 60, and a plurality of retaining members 24 secured about the front opening 22. The housing 20 with the corn cobs 50 and particulate corn 60 is preferably dipped within a wax material after formed. A wick member 40 preferably is positioned within the front opening 22 for assisting in the lighting of the fire log system.

As shown in FIGS. 1 through 7 of the drawings, the present invention includes a housing 20 having a front opening 22. The housing 20 may have various shapes, sizes and structures, however it is preferred to have a generally rectangular structure as illustrated in the drawings. The housing 20 is comprised of a flammable material such as but not limited to wood boards and the like. The housing 20 may be constructed utilizing flammable or non-flammable securing devices such as but not limited to wood glue, dowels, nails, screws and the like.

A handle structure 30 is preferably attached to the housing 20 that allows for manual manipulation of the present invention by a user. The handle structure 30 is preferably comprised of a flammable material such as twine, string, cord and the like.

Figure 3:
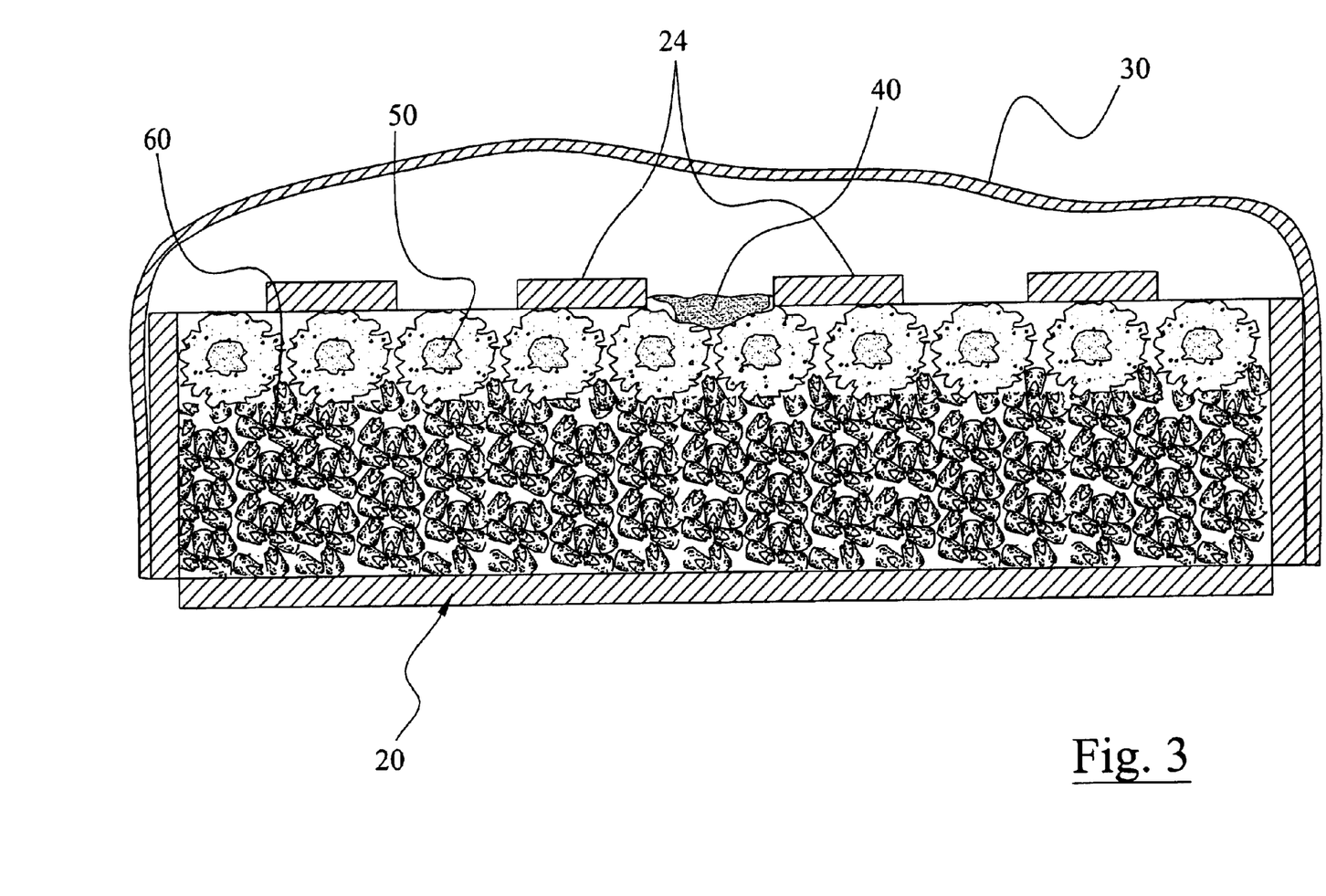
FIG. 3 is a cross sectional view taken along line 3—3 of FIG. 1.
Figure 4:
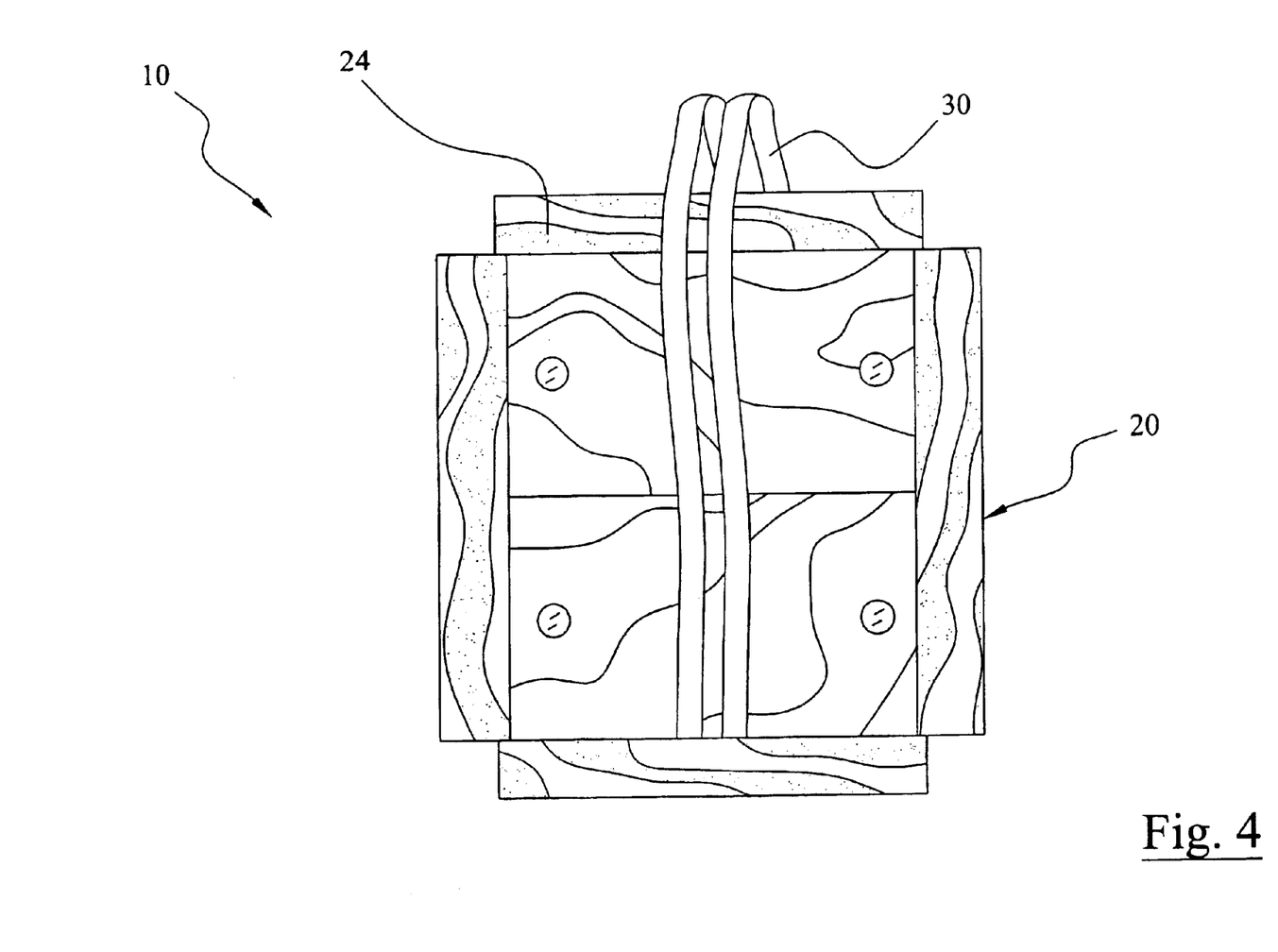
FIG. 4 is an end view of the present invention.
Figure 5:
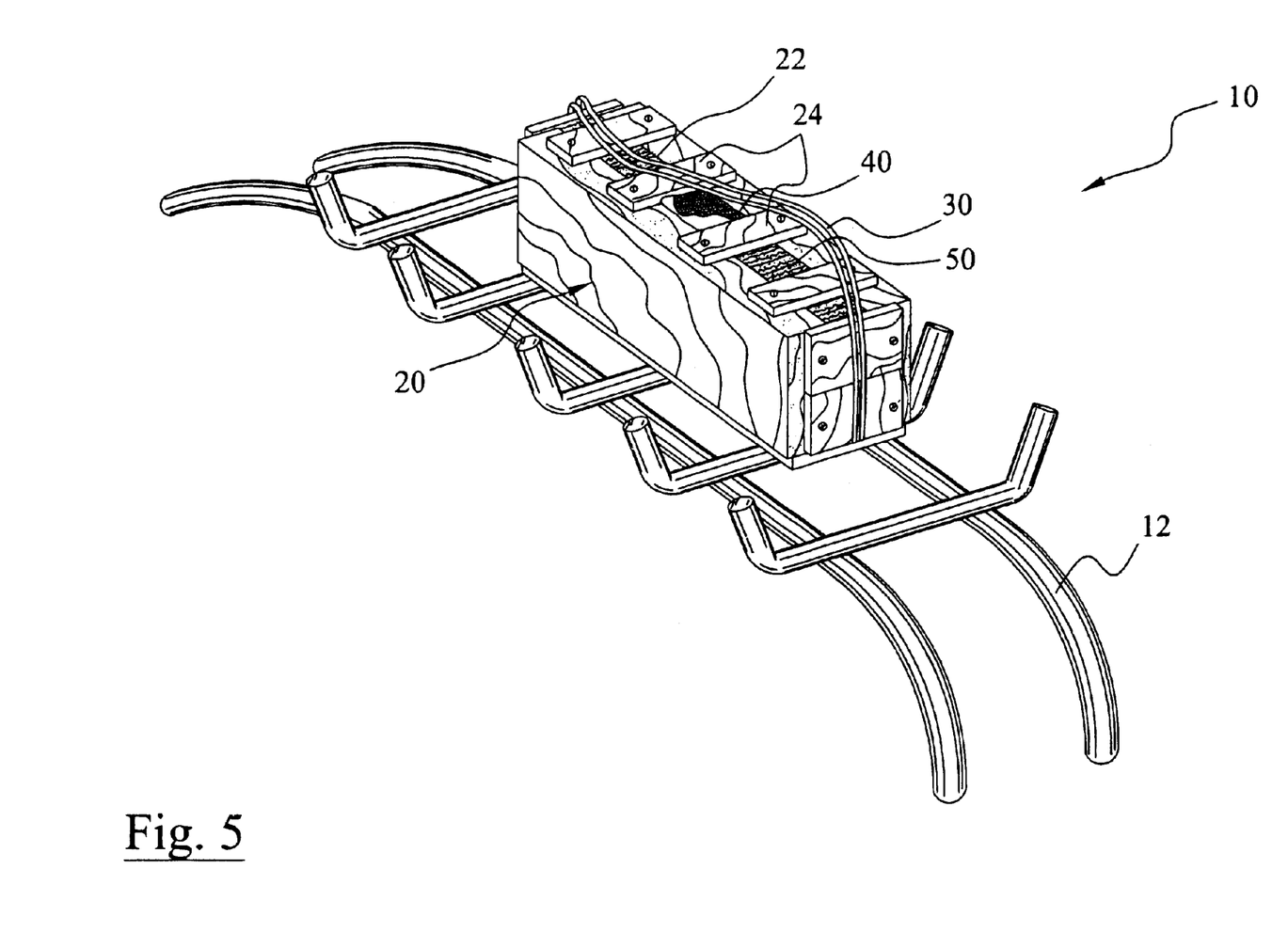
FIG. 5 is an upper perspective view of the present invention positioned upon a fireplace grate.

The housing 20 has an interior cavity that is partially filled with a volume of particulate corn 60 as best illustrated in FIG. 3 of the drawings. The particulate corn 60 may be comprised of whole kernel or partial kernel corn. The particulate corn 60 may be ground into smaller particulates. The particulate corn 60 may also be comprised of a combination of whole corn kernels and partial kernels.

Figure 1:
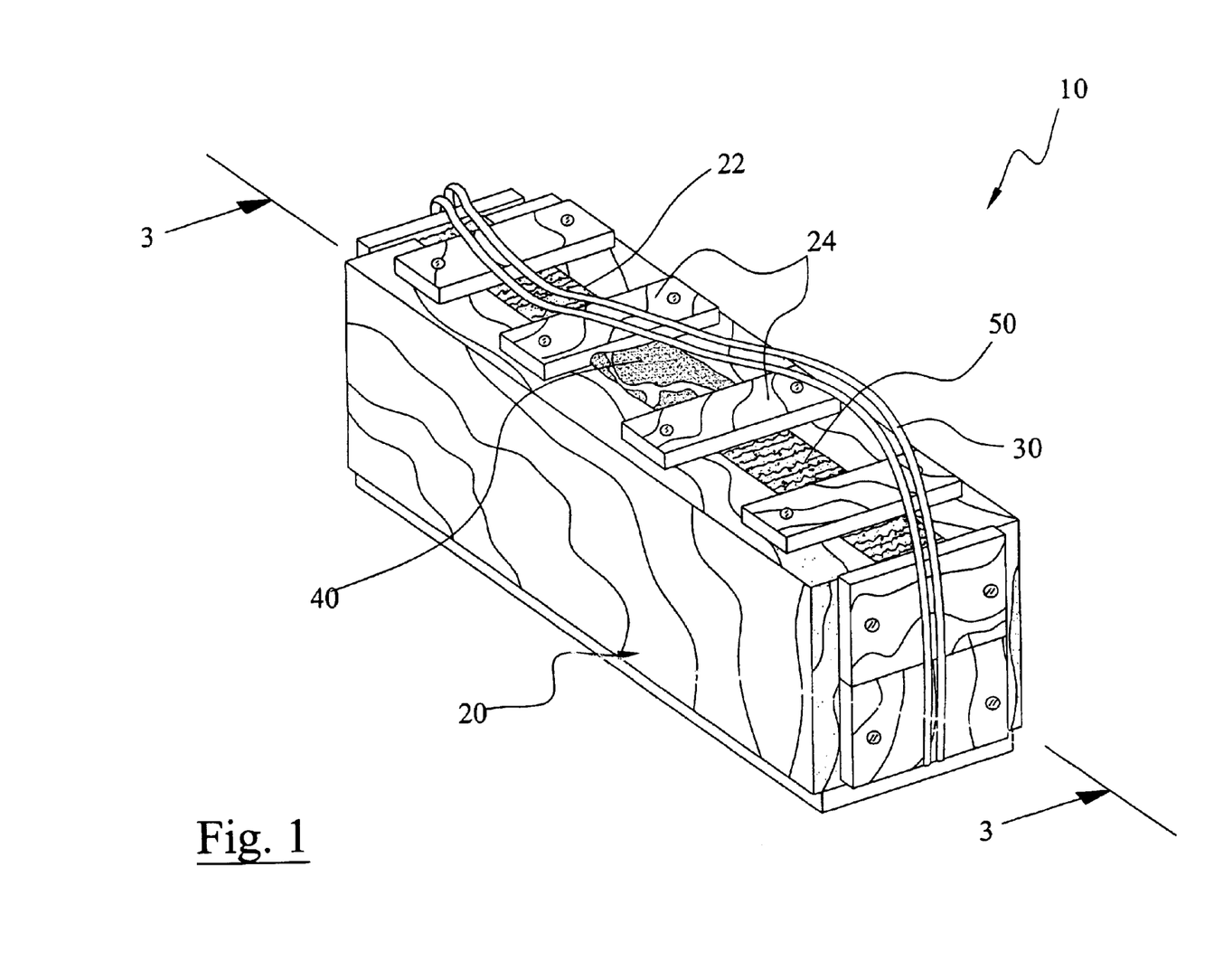
FIG. 1 is an upper perspective view of the present invention.
Figure 2:
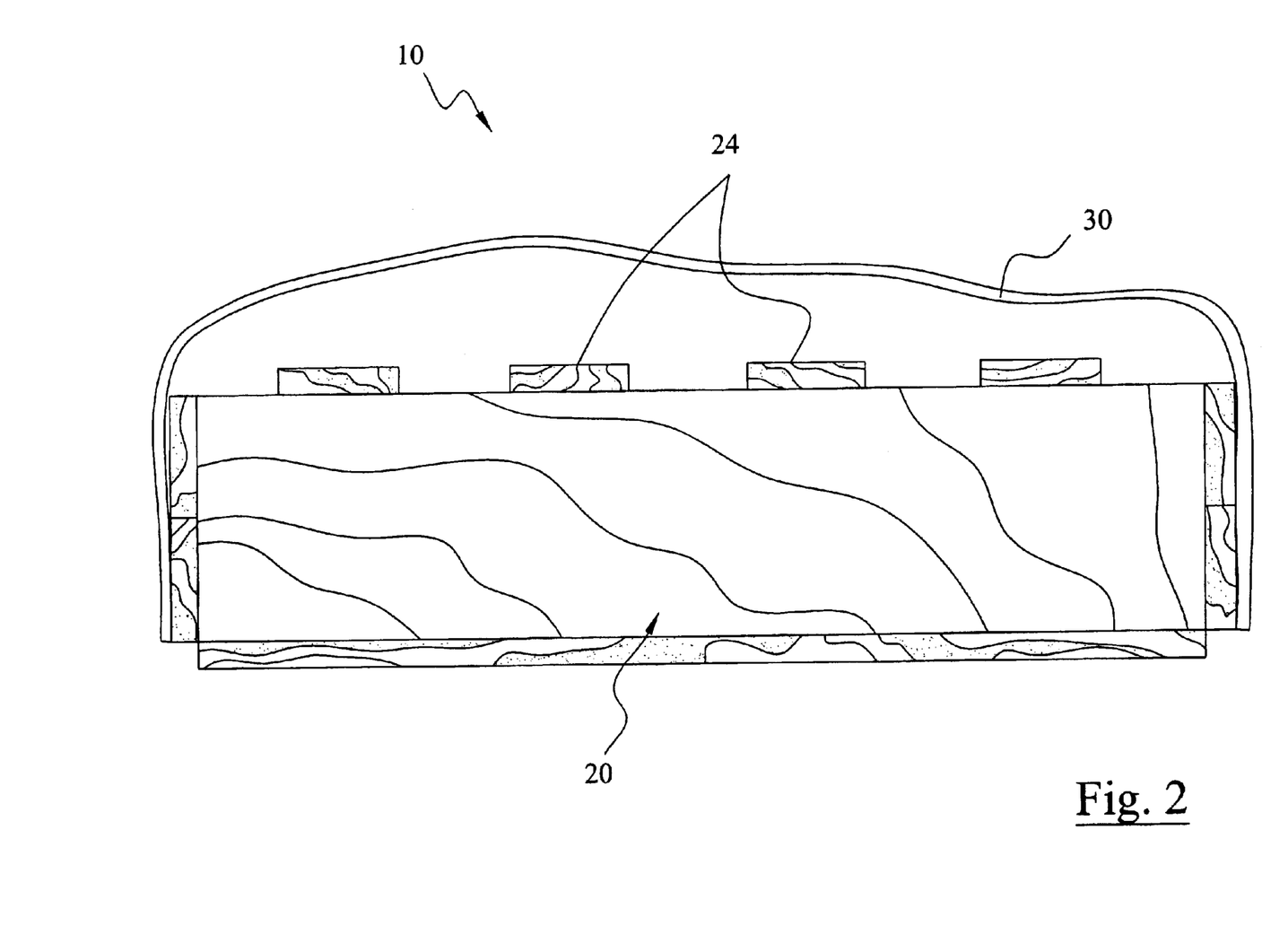
FIG. 2 is a side view of the present invention.

A plurality of corn cobs 50 are positioned upon the particulate corn 60 within the front opening 22 for preventing the escape of the particulate corn 60 through the front opening 22 as best shown in FIGS. 1 and 3 of the drawings. The corn cobs 50 preferably do not have any corn kernels remaining, however the corn cobs 50 may have corn kernels attached thereto. The plurality of corn cobs 50 are preferably aligned adjacent and substantially parallel to one another transverse with respect to the front opening 22 as best illustrated in FIG. 3 of the drawings.

The corn cobs 50 are retaining within the housing 20 by a plurality of retaining members 24 attached to the housing 20 about the front opening 22 as shown in FIGS. 1 through 5 of the drawings. The retaining members 24 are preferably comprised of a flammable material such as but not limited to wood. The retaining members 24 are preferably distally spaced for allowing of partial viewing of the corn cobs 50 while retaining the corn cobs 50 within the housing 20.

A wick member 40 is preferably positioned within the housing 20 accessible through the front opening 22 of the housing 20. The wick member 40 may be comprised of any type of material that is flammable such as but not limited fiber, paper and the like. The wick member 40 is utilized to initiate a fire within the fire log system 10.

The fire log system 10 is preferably dipped within heated wax for a period of time for allowing the wax to penetrate into the housing 20, corn cobs 50 and particulate corn 60. The fire log system 10 is thereafter removed and allowed to cool with the wax hardening further preventing the likelihood of losing particulate corn 60 or corn cobs 50. The wax may or may not be scented for providing a pleasant smell. The wax also assists in maintaining of the fire after the fire log system 10 has been lighted. The wax may be comprised of any well-known wax based material.

Figure 6:
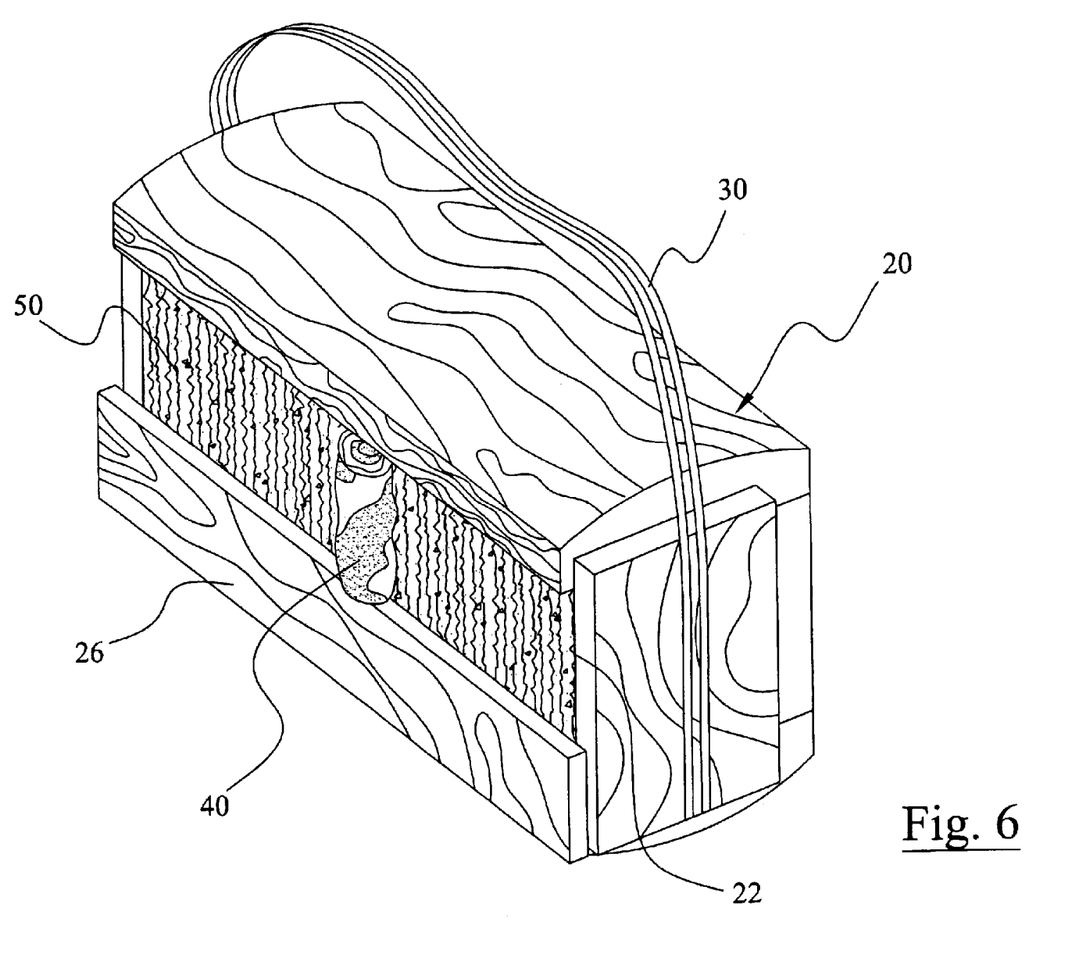
FIG. 6 is an upper perspective view of an alternative embodiment of the present invention.
Figure 7:
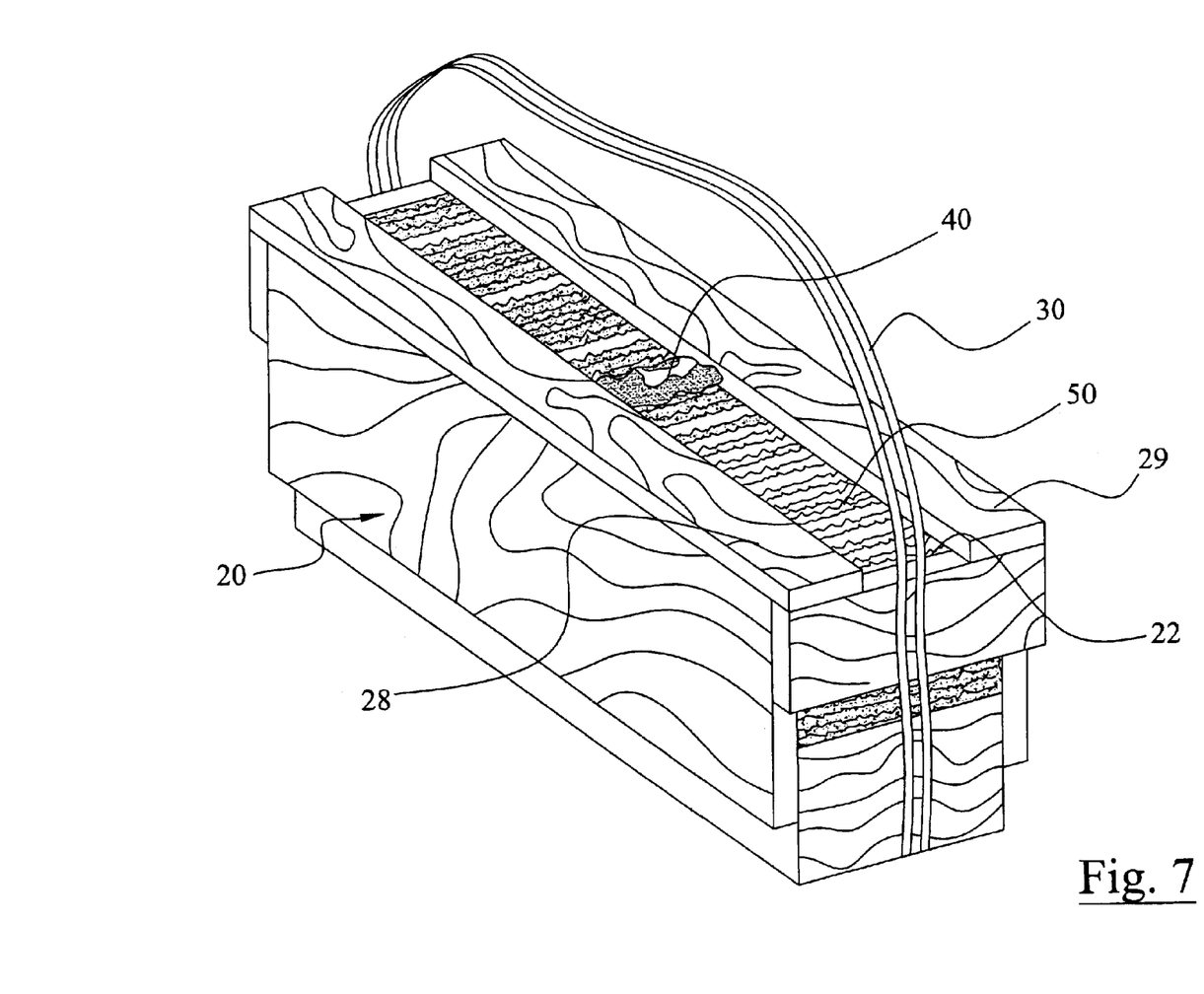
FIG. 7 is an upper perspective view of a second alternative embodiment of the present invention.

FIG. 6 illustrates an alternative embodiment where a front retaining member 26 is utilized upon one side of the front opening 22 for retaining the corn cobs 50 within the housing 20. FIG. 7 illustrates a second alternative embodiment where a first retaining member 28 and a second retaining member 29 are secured to opposing sides of the opening with a center slot exposing the corn cobs 50.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fire log system, comprising:

a housing having a front opening and an interior cavity;

a volume of particulate corn positioned within said interior cavity;

a plurality of corn cobs positioned within said front opening adjacent said particulate corn; and a plurality of retaining members attached to said housing about said front opening for retaining said corn cobs within said housing.

2. The fire log system of claim 1, wherein said housing, said particulate corn, said corn cobs and said retaining members are immersed with a wax material.

3. The fire log system of claim 1, including a wick member positioned within said housing and accessible through said front opening.

4. The fire log system of claim 1, wherein said corn cobs are positioned adjacent to one another and parallel to one another.

5. The fire log system of claim 4, wherein said corn cobs are positioned transverse with respect to said front opening.

6. The fire log system of claim 1, wherein said housing has a rectangular structure.

7. The fire log system of claim 1, including a handle structure attached to said housing.

8. The fire log system of claim 1, wherein said handle structure is comprised of a flexible and flammable material.

9. The fire log system of claim 1, wherein said particulate corn is comprised of whole kernels and partial kernels.

10. A fire log system, comprising:
a housing having a front opening and an interior cavity;
a volume of particulate corn positioned within said interior cavity;
a plurality of corn cobs positioned within said front opening adjacent said particulate corn, wherein said corn cobs are positioned adjacent to one another and parallel to one another and transverse with respect to said front opening;
a plurality of retaining members attached to said housing about said front opening for retaining said corn cobs within said housing;
wherein said housing, said particulate corn, said corn cobs and said retaining members are immersed with a wax material;
a wick member positioned within said housing and accessible through said front opening; and
a handle structure attached to said housing.

11. A fire log system, comprising:
a housing having a front opening and an interior cavity;
a volume of particulate corn positioned within said interior cavity;
a plurality of corn cobs positioned within said front opening adjacent said particulate corn; and
a first retaining member attached to said housing about said front opening for retaining said corn cobs within said housing.

12. The fire log system of claim 11, wherein said housing, said particulate corn, said corn cobs and said retaining members are immersed with a wax material.

13. The fire log system of claim 11, including a wick member positioned within said housing and accessible through said front opening.

14. The fire log system of claim 11, wherein said corn cobs are positioned adjacent to one another and parallel to one another.

15. The fire log system of claim 14, wherein said corn cobs are positioned transverse with respect to said front opening.

16. The fire log system of claim 11, wherein said housing has a rectangular structure.

17. The fire log system of claim 11, including a handle structure attached to said housing.

18. The fire log system of claim 11, wherein said handle structure is comprised of a flexible and flammable material.

19. The fire log system of claim 11, wherein said particulate corn is comprised of whole kernels and partial kernels.

20. The fire log system of claim 11, including a second retaining member attached to said housing about said front opening opposite of said first retaining member for retaining said corn cobs within said housing.

* * * * *